United States Patent [19]

Rosman

[11] 4,223,433
[45] Sep. 23, 1980

[54] METHOD OF JOINING WORKPIECES WITH A RIVET FASTENER SYSTEM

[76] Inventor: Irwin E. Rosman, 23710 Clarendon St., Woodland Hills, Calif. 91364

[21] Appl. No.: 914,858

[22] Filed: Jun. 12, 1978

Related U.S. Application Data

[60] Division of Ser. No. 681,431, Apr. 29, 1976, Pat. No. 4,126,076, which is a division of Ser. No. 549,330, Feb. 12, 1975, Pat. No. 3,995,406, which is a continuation-in-part of Ser. No. 360,533, May 15, 1973, abandoned, and Ser. No. 480,760, Jun. 19, 1974, abandoned, which is a continuation-in-part of Ser. No. 321,457, Jan. 5, 1973, abandoned.

[51] Int. Cl.² ................ B21D 39/00; B23R 11/00
[52] U.S. Cl. ..................... 29/509; 29/522 A; 29/526 A; 29/243.54
[58] Field of Search ........... 29/522 R, 522 A, 526 A, 29/509, 243.54; 85/37, 82

[56] References Cited

U.S. PATENT DOCUMENTS

| | | | |
|---|---|---|---|
| 1,864,377 | 6/1932 | Sieffert | 85/37 |
| 1,947,906 | 2/1934 | Fine | 85/82 |
| 2,144,701 | 1/1939 | Campbell et al. | 29/522 R UX |
| 2,451,356 | 10/1948 | Rechton | 85/82 X |
| 2,925,748 | 2/1960 | Ross | 29/243.54 |
| 2,955,505 | 10/1960 | Schuster | 85/37 X |
| 3,432,925 | 3/1969 | Wooley | 29/509 X |

Primary Examiner—Charlie T. Moon
Attorney, Agent, or Firm—Donald D. Mon

[57] ABSTRACT

A metal rivet, a two-piece rivet assembly, and a joint including the assembly. The metal rivet includes a preformed head at one end of a solid shank. At the other end there is a tubular upsettable portion which is circularly cylindrical with a recess which terminates at a base opening at said other end of the solid shank. The tubular upsettable portion is so proportioned as to form a proper upset head. At least a part of a core pin fits in the tubular upsettable portion and is retained therein after the rivet is set. During setting it prevents internal buckling of the tubular upsettable portion, and after setting it reinforces the upset head to prevent rollout as a consequence of axial separative forces. As an optional feature, at the terminal part of the forming of the upset head, the core pin can be pressed against the base to swell the solid shank and create a closer, or even an interference, fit for the shank in a workpiece.

1 Claim, 23 Drawing Figures

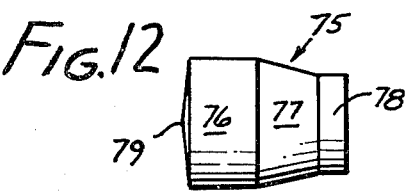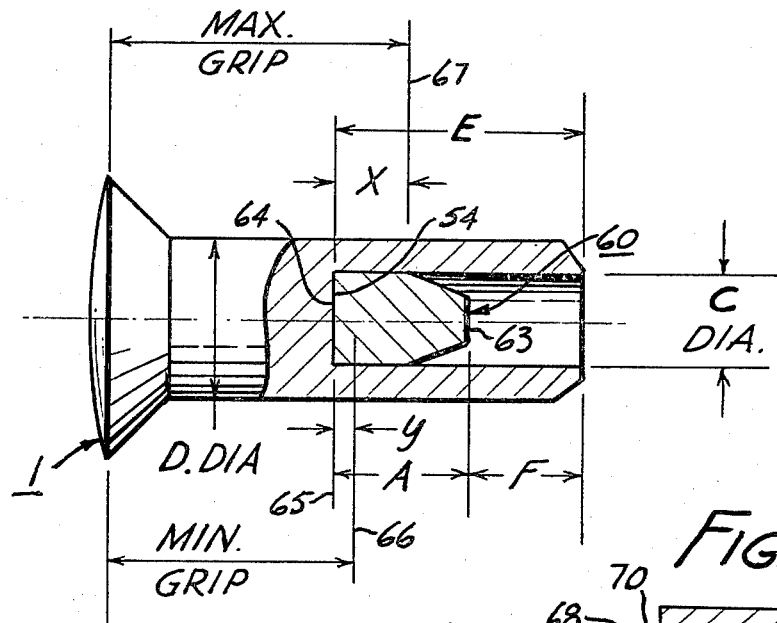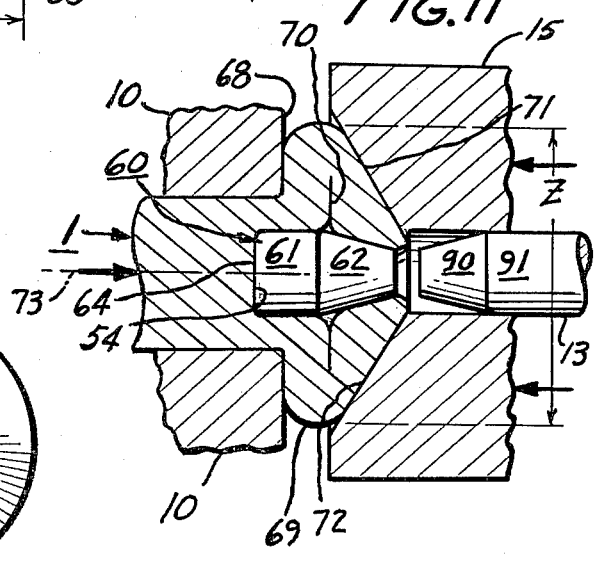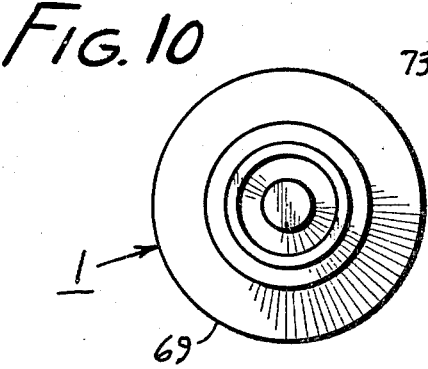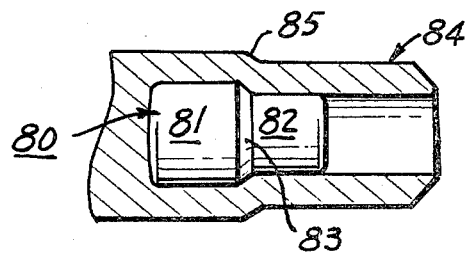

-MINIMUM GRIP

METHOD OF JOINING WORKPIECES WITH A RIVET FASTENER SYSTEM

CROSS-REFERENCE TO OTHER PATENT APPLICATIONS

This is a division of applicant's co-pending U.S. patent application, Ser. No. 681,431, filed April 29, 1976, now Pat. No. 4,126,076, issued Nov. 21, 1978, which in turn is a division of applicant's patent application Ser. No. 549,330, filed Feb. 12, 1975, entitled "Rivet Fastener System" (now U.S. Pat. No. 3,995,406, issued Dec. 7, 1976), which in turn is a continuation-in-part of applicant's U.S. patent applications, Ser. No. 360,533, filed May 15, 1973, entitled "Hollow End Reinforced Rivet Fastener", and Ser. No. 480,760, filed June 19, 1974, entitled "Rivet Fastener System", the latter also being a continuation-in-part of applicant's U.S. patent application Ser. No. 34,457, filed Jan. 5, 1973, entitled "Rivet Fastener System". Applications Ser. Nos. 321,457, 360,533 and 480,760 are now abandoned.

This invention relates to a rivet-type fastener which makes possible the use of relatively high-strength rivet materials even in relatively softer workpieces, without damaging the workpiece during installation.

Riveting of aluminum aircraft structure is normaly performed with the use of low-strength rivet materials such as aluminum or monel metals of relatively low strength. High-strength materials (i.e., materials having unit shear strengths on the order of 40,000–100,000 psi or higher) are not normally used in riveting the more critical, heavily shear-loaded joints, because the upset head forming of rivets made of high-strength materials in the softer sheets tends to over-expand and damage the hole. This causes severe distortion of the structure. Accordingly, at the present time, high-strength pins are used in softer materials, together with retaining collars of the threaded or swaged interlocking types, instead of rivets. Because an interference fit is desirable in order to extend the fatigue life of this kind of joint, such pins are customarily pressed into an undersized hole.

A recent invention which is shown in Rosman U.S. Pat. Nos. 3,426,641 and 3,747,467 permits the upset forming of high-strength, solid shank rivets in relatively soft aluminum sheets without adversely affecting the hole. This is accomplished by the use of a special forming collar. This collar, however, requires separate handling during installation, just as in the case of the pin and collar system. Installation cost and complexity are thereby substantially increased.

Rivets made of high-strength materials which have solid shanks and hollow ends can be upset wihout adversely affecting the structure in which the hole is formed, but if the tubular end of a hollow end rivet is unsupported while it is being upset, then internal buckling, eccentric head formation, and cracking of the tubular end can result. In addition, because there is no internal support of the hollow upset end in a conventional hollow end rivet when it is finally formed, the head cannot then effectively resist the relatively high tensile separative loads on the joint. It is an object of this invention to provide a rivet made of relatively high-strength material wherein an upset head can be formed without adversely affecting the structure in which the hole is formed, the upset head of which can be made substantially as strong as the preformed manufactured head for resisting tensile separative forces at the structural joint. It is another object of this invention to provide means for supporting the hollow tubular end of the rivet while it is being upset to prevent its buckling internally or forming in an eccentric shape or at an off-center location.

Still another object of the invention is to provide a high-strength fastener system which does not require the use of a separate collar, or any other part which must be separately handled, so that installation handling cost and complexity can be substantially reduced.

Yet another object of this invention is to provide a high-strength fastener system wherein only one material need by in contact with the structure, thereby minimizing the susceptibility of the resulting joint to galvanic corrosion.

Still another object of the invention is to provide a fastener whose shank can be diametrically expanded so as to pre-stress the hole during installation, thereby extending the fatigue life of the resulting joint.

Still other objects of the invention are to provide a metal rivet suitable for use in joining workpieces together, and a joint incorporating the same.

The rivet fastener system of the present invention is primarily intended for joining structural members, such as aluminum aircraft sheets and stiffeners, although it may be used for joining other classes of structural members as well. The rivet assembly is comprised of a rivet and a core pin. The rivet is made of a high-strength material which can be on the order of 40,000–100,000 psi. It has a shank which is solid for the major portion of its shear-bearing length, with a preformed head at one end and a circularly cylindrical tubular upsettable portion at the other end. The tubular upsettable portion bounds a recess which enters the rivet from said other end. The recess depth, and thereby the length of the upsettable portion, is a predetermined length to obtain the desired upset head, and is so proportioned as to form an acceptable upset head. The length of the solid shank portion is of a predetermined length relative to the combined thickness (grip) of the structural members. The tubular upsettable end is upset to form a head which, in combination with the preformed head at the other end, retains the structural members (sometimes called "objects") which are joined by the rivet from separating under axial tensile forces exterted at the joint. Because a hollow tube is readily formed into an upsettable head by axial end forces, no overexpansion or excessive distortion of the hole will result, even when a rivet of high-strength material is upset to joint softer aluminum sheets.

The core pin is pre-assembled into the recess and prevents the tubular upsettable portion from buckling internally or forming into an eccentric shape. After installation, the core pin remains in place centrally to support the upset head in resisting the tensile forces at the structural joint.

Because the rivet is the only component in contact with the workpieces being joined, as compared with the two components of the generally-used pin and collar systems, the joint is less susceptible to galvanic corrosion. This results from having fewer material systems and, therefore, fewer galvanic couples at the joint. Because the upset head forms an integral part of the rivet and also because the core pin can be pre-assembled to the shanked portion of the rivet, installation cost and complexity of assembly is substantially reduced as compared with two-piece fastener systems having separate collars.

According to an optional feature of the invention, the solid shank can be compressed by forces exerted through the core pin during at least the terminal portion of the upset formation of the tubular portion. The resulting enlargement of the shank can result in the creation of an interference fit or in an increase of an already-existing interference fit, either of which tends to extend the fatigue life of the structural joint.

The above and other features of this invention will be fully understood from the following detailed description and the accompanying drawings in which:

FIGS. 9 and 10 are, respectively, an axial cross-section and a right-hand end view, of the presently-preferred embodiment of the invention, together with dimensional notations;

FIG. 11 is an axial cross-section of part of the rivet of FIG. 9 in its set condition together with tooling for setting the same;

FIG. 12 is a side view of an alternative core pin construction;

FIG. 13 is a fragmentary axial view, partly in cross-section, showing another embodiment of core pin;

Figure 1:
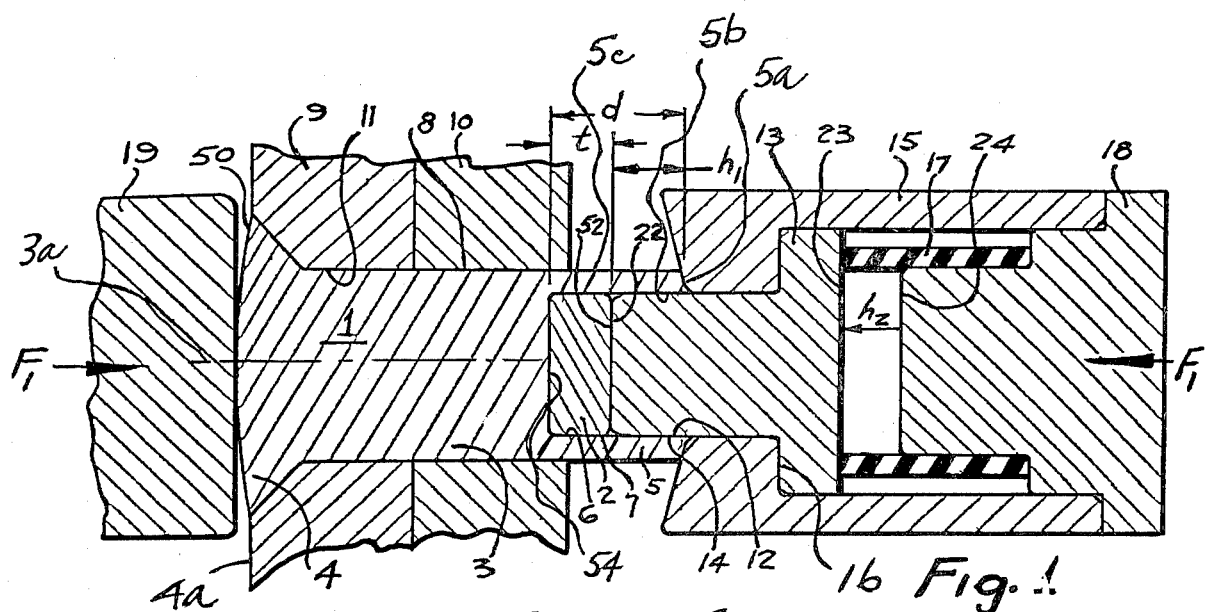
FIG. 1 is an axial sectional view of a flush-head type fastener system of the present invention, together with tooling for upsetting the same, the tooling being illustrated in its condition prior to upset forming.

FIG. 1 illustrates the presently preferred embodiment of a flush-head type fastener system according to the present invention, together with the upset tooling for upsetting the head. The system is shown in the condition which exists prior to upset forming. The fastener system is comprised of a rivet 1 and a core pin 2. The rivet has a solid shank 3 with a central axis 3a, a preformed head 4 at a first end 4a, and a hollow, tubular, upsettable portion 5 at the other end 5a of the rivet. Upsettable portion 5 encloses a recess that is bounded by a circularly cylindrical internal surface 5b of a predetermined length d to provide the desired upset head. The volume of the tubular upsettable portion 5 is a function of the length, wall thickness, and diameters of the upsettable portion.

An external circularly cylindrical surface 5c forms the external boundary of the solid shank and of the upsettable portion.

The diameter 6 of the core pin is such that the core pin can be placed in the recess. Preferably, its diameter is about equal to internal diameter 7 of the tubular upsettable portion, and preferably enough larger to make a tight retentive fit therein. However, a clearance around the core pin can be tolerated if the core pin is otherwise secured in the recess. A press fit is preferred, because it is less complicated to assemble, and is commercially more acceptable as to reliability of retention. Retention of the core pin in the recess permits handling the rivet assembly as though it were a single-piece fastener, thereby decreasing the installation handling cost and complexity. The core pin makes contact with the base 54 of the recess.

The rivet is preferably made of high-strength material, i.e., a material having upwards of about 40,000 lbs. per square inch unit shear ultimate strength or greater. The material should have ductility values of at least ten percent elongation, and at least thirty percent reduction in area. Such ductility values are necessary to preclude cracking of the upset head during upset forming. The preferred range of elongation is 15–20 percent, and the preferred range of reduction in area is between about 40–60 percent.

The rivet is installed in hole 8, which is common to the structural panels 9 and 10. That is to say, aligned holes are formed in the two panels. Diameter 11 of the shank can be made somewhat smaller than the hole diameter to facilitate installation, although a press fit is also permissible. The relationship between these diameters will be described in detail later.

Core pin 2 is made of a material whose unit compressive yield strength is substantially equal to (it may be somewhat less) or greater than that of the material of which the rivet is made. It is intended that the core pin substantially retain its shape when the rivet is set, and not exert any substantial radially outward forces on the tubular upsettable portion which might tend to enlarge that portion. The core pin has a thickness t, which is less than dimension d, and leaves an extended portion $h_1$ to receive and coaxially locate an inner tool piece 13 by engagement of the wall designated by diameter 12 within the wall designated by diameter 14 of the recess until an inner tool piece surface 22 contacts core pin surface 52.

The tooling system shown provides the required load sequencing of upset forming for a fastener system according to one method of this invention, wherein the tubular upset end is first formed and then, during at least the terminal portion of the upset forming, a compressive force is exerted on the solid shank through the core pin to swell the solid shank while finishing the formation of the upset head. As will later be disclosed, this system is adaptable to use in other setting techniques in which no compressive force is exerted on the core pin.

The outer tool piece 15 locates on the inner tool piece 13, and slides forward in a direction to upset the tubular upsettable portion 5. The resulting upset is that of a tubular collapse. In the course of this collapse, the hollow tubular upsettable end "barrels" out and folds to form the upset head. This is best shown in FIG. 11. This is not a compression-yield-formed head (although it could be, depending on the relative dimensions of the tubular upsettable portion), but is instead a collapsed bulb-shaped structure having an outer diameter Z (FIG. 11).

The inner tool piece 13 is held in its initial position against shoulder 16 by an elastomer or a spring 17. Distance $h_2$ is predetermined, relative to dimension $h_1$.

Figure 2:
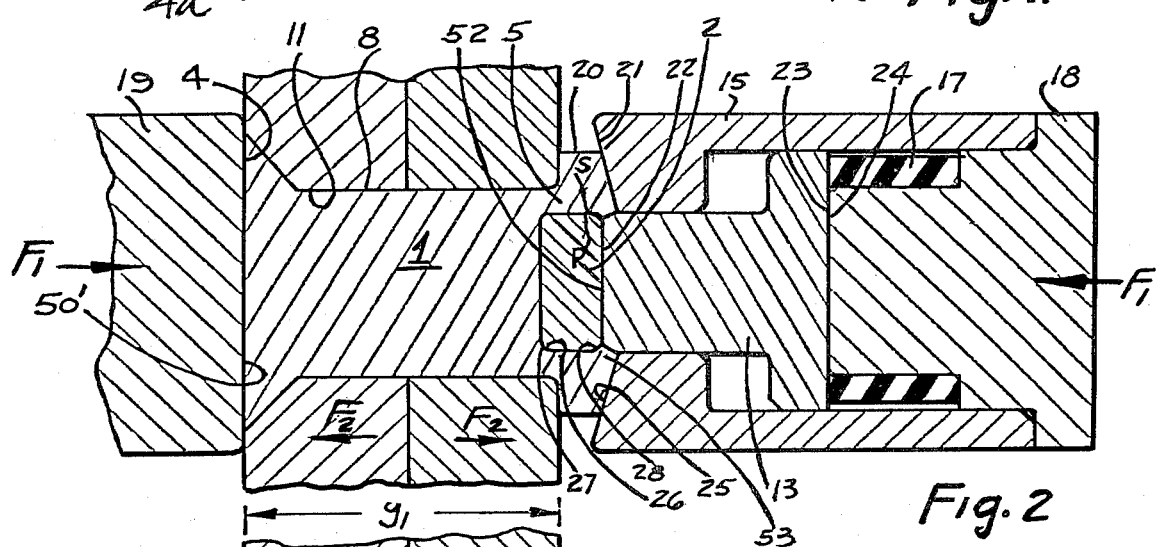
FIG. 2 is a sectional view of the fastener system and tooling of FIG. 1, after upset forming.

As illustrated in FIG. 2, forces $F_1$ are applied by the tooling 18 and 19 at the upsettable head end and at the preformed head end, respectively. The preformed head 50 is preferably of crown shape to concentrate the load through the center of the rivet shank. Such a crown shape can also be applied to the protruded head of FIG. 8. The elastomer 17 is compressed, and tool piece 18 advances toward inner tool piece 13 while forcing the body 15 to upset the tubular upsettable end 5, thereby to form an upset head 20. When $h_2$ decreases to zero, i.e., when tool surfaces 24 and 23 meet, then surfaces 21 and 22 on the outer and inner tool pieces apply loads simultaneously to the upset head surface 25 and to core pin surface 52, which compresses the shank. This is to say that in the terminal portion of the process of the head-forming operation, the tool simultaneously applies an end load to the solid shank through the core pin which tends to swell the shank, and which completes the upset head. As previously mentioned, the shank-swelling is an optional technique, and can be eliminated by appropriate modification or adjustment of the tooling.

Because of the high strength of the core pin, the load applied to the core pin to swell the solid shank is carried axially directly through it to the solid rivet shank, without causing an excessive diametrical expansion of the core pin itself. The forces $F_1$ continue to increase, and the rivet shank diameter expands to fill and to expand hole 8 until the desired interference fit is obtained, usually in the approximate range from about 0.002 to 0.010 inch. Interference fit, as the term is used herein, is defined as the difference between the diameter 11 of the rivet shank, in its relaxed condition after upset, and the diameter 8 of the hole as it existed before the rivet was placed in the hole.

In the embodiment of FIG. 1, the core pin has equal corner radii 26 and 28 (see FIG. 2) at its axially opposite faces, which radii are substantially equal to the fillet radius 27 of the recess, so that the core pin can reversibly be installed in the recess. This also permits flow of upset head material 53 to enclose the corner radius 28, thereby incorporating a preferable interlocking means between the core pin and the upset rivet. Identity of construction at both ends of the core pin is not necessary. As can be seen from an examination of FIGS. 9 and 10, a taper can be provided on only one end of the core pin, and such a core pin would not be reversible, because its ends are not identical.

It can be seen that core pin 2 laterally reinforces the tubular upsettable end during the upset formation of the head, and prevents internal buckling or eccentric formation of the head. By "reinforcement" is meant that it is present to form a bulwark against internal buckling, and also forms a bulwark preventing the upsettable end of the rivet from moving laterally to form an eccentric or off-center head. However, the entire area of the outer wall of the core pin need not be in contact with the upsettable tubular portion, although, depending on dimensions, it could be. The core pin also reinforces the upset head by the forces P after the assembly has been completed. These forces P prevent rotation or roll over of the upset head in the direction S under the tensile separating forces $F_2$. Thus, the resulting supported upset head is made substantially as strong as the preformed head. It will also be seen that the core pin can transmit an upsetting load for expanding (swelling) the solid shank directly to the solid shank, causing diametral expansion of the shank, and resulting in an interference fit installation which substantially extends the fatigue life of the structural joint. The usage of this expansion feature is optional. The rivet has substantial utility even without the said expansion.

Figure 3:
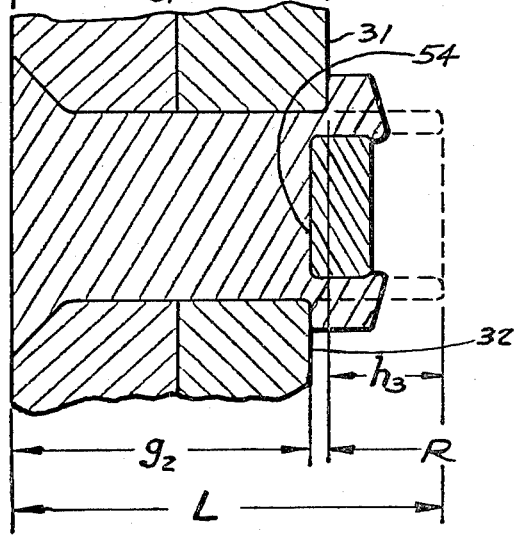
FIG. 3 is a sectional view of the fastener of FIG. 1 before and after upset forming (in the dashed line and solid line notation, respectively), with different panel thicknesses (grips)

The core pin has the important additional function of permitting a given length of fastener to be used for a substantial range R of panel thickness variation (grip range). Grip range is defined as the difference in thickness, or grip, from $g_1$ maximum grip to $g_2$ minimum grip, as illustrated in FIG. 3.

The normally commericially acceptable grip range R in which a fastener must perform is 1/32 inch. For a ¼ inch diameter fastener, this range would be ⅛ of its shank diameter. This grip range R is shown in approximate relative scale in FIG. 3, which is the difference between the maximum and minimum grip $g_1$ and $g_2$ shown above and below the centerline, respectively, in which a fastener of a given length L must perform. It is instructive to note that with the instant invention, in all but the smaller sizes (about 5/32 inch shank diameter and less), the grip range attainable is at least 1/16 inch, about double that which has formerly been regarded as acceptable. In said smaller sizes, the grip range will be at least 1/32 inch. A fastener of given length must be satisfactory for use with a substantial range of increment or grip variation, since sheet thicknesses may vary within manufacturing tolerances. Also, tapered sheets are sometimes used which would change the grip along the length of the rivet pattern, and it is clear that a different fastener length could not practically be used to accommodate every minute change in work thickness.

The base 54 of the recess is disposed below the panel rear surface 31 (sometimes called the "exposed surface" of the workpieces) by the distance R, in the maximum grip condition, and does not stand above surface 32 in the minimum grip condition. This is to say that in a proper installation, base 54 will be disposed at the back surface of the workpiece, or below it, but never above it. In order to bottom the upset head against the surface 32 without cracking the head, it is necessary for only tubular upsettable material, and not solid shank material, to project beyond the surface 32.

The shape of the upset head will vary somewhat, but within permissible limits, when the identical rivet is formed at various of its grips within its grip range. This is because a given amount of volume of pre-upset length $h_3$ of the tubular upsettable portion will project beyond the surface 32, which varies with the individual grip. Nevertheless, a useful head will be obtained at any grip within the established grip range. A principal criterion for an acceptable head is that the ratio Z/D (see FIGS. 9 and 11), i.e., the ratio between the outer diameter of the upset head as formed and the outer diameter of the solid shank, should be at least as great as about 1.3. The core pin is a vital component in allowing the hollow end rivet to be insensitive to a wide range of grip variations, while still providing the function of shank expansion.

The aforesaid functions of the core pin constitute an important feature of this invention, and serves to distinguish this invention from conventional single-piece hollow end rivets. This will be evident from the subsequent descriptions and Figs. wherein conventional rivets are discussed.

Figure 4:
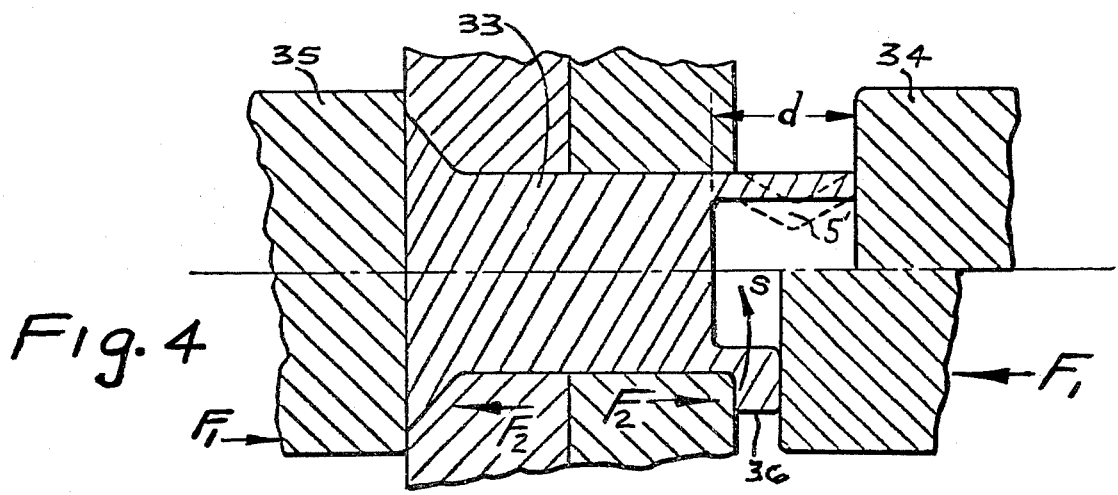
FIG. 4 is a sectional view of a conventional hollow end rivet and related upset tooling, illustrated both before and after upset forming.

FIG. 4 shows a conventional hollow end rivet 33 with conventional head upset tooling 34 and 35, before and after upset, above and below the centerline, respectively. The recess depth d for obtaining the necessary upset head volume is indicated. Without core pin support, internal buckling or eccentric forming of the hollow end 5' can easily result, as indicated by dashed lines. Even if the head 36 is upset satisfactorily, as shown below the centerline, it is unsupported from within and can easily yield in the direction S (buckling inwardly) under the axial separative forces $F_2$. It can also be seen that force $F_1$ cannot be transmitted to expand the center portion of the shank.

Figure 5:
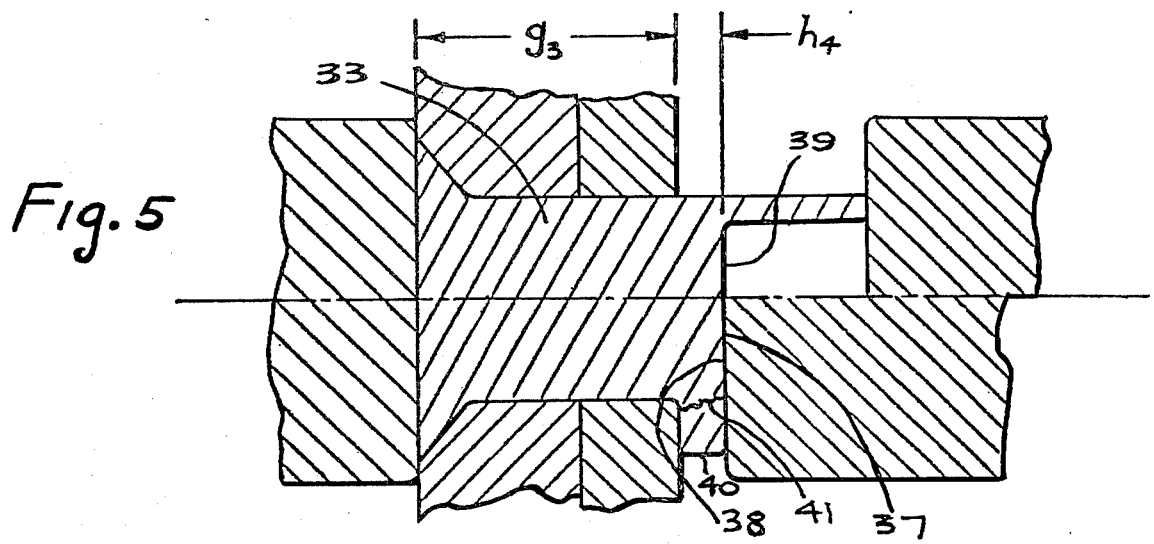
FIG. 5 is another sectional view of a conventional hollow end rivet and related upset tooling, illustrated both before and after upset forming.

FIG. 5 shows a conventional hollow end rivet 33, before and after upset, above and below the centerline, respectively. The thickness $g_3$ was chosen such that, after upset, the tool surface 37 can contact rivet surface 38 to expand the rivet shank inner portion. Recess surface 39 is above surface 31 in an amount $h_4$ equal to the thickness of the upset head 40. The hollow portion is forced over the extended portion of solid shank the distance $h_4$, and cracking of the upset head as indicated by line 41 can thereby easily result. Also, there is no internal support to prevent buckling of the hollow shank end during upset.

Figure 6:
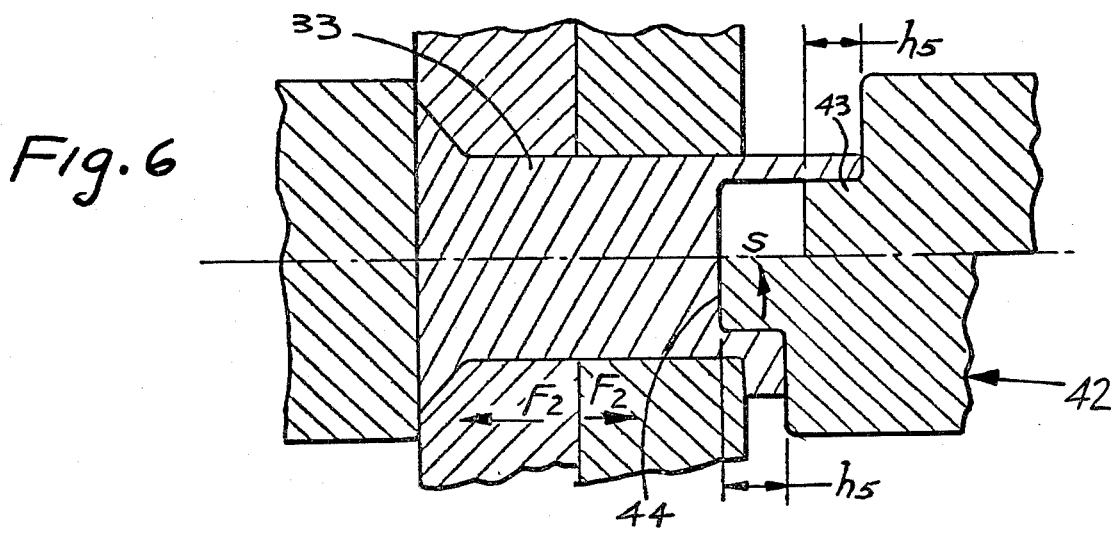
FIG. 6 is a sectional view of a conventional hollow end rivet, together with modified related conventional upset tooling, illustrated both before and after upset forming.

FIG. 6 shows the conventional hollow end rivet 33, before and after upset, above and below the centerline, respectively. Modified conventional upset head tooling 42 has a nose section 43 of length $h_5$ which, after upset heading, contacts surface 44 to cause shank expansion. It can be seen that only partial support of the hollow end during upset is achieved, and that again the upset head is not internally supported and will easily yield under the axial tensile forces $F_2$, in the direction S.

Figure 7:
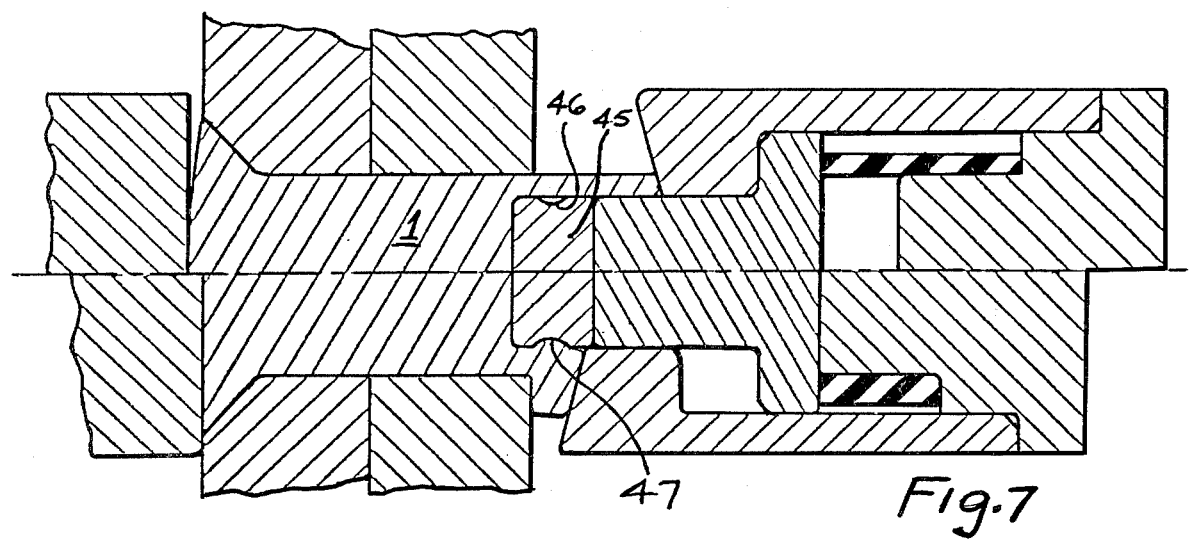
FIG. 7 is a sectional view of another form of the fastener system of the present invention, together with upset tooling, illustrated both before and after upset forming.

FIG. 7 illustrates another form of the present invention, indicating before and after upset conditions, above and below the centerline, respectively. The circumferential groove 46 of core pin 45 presents a means for interlocking the upset hollow end surface 47. Material of the hollow end enters the groove to form a lock.

Figure 8:
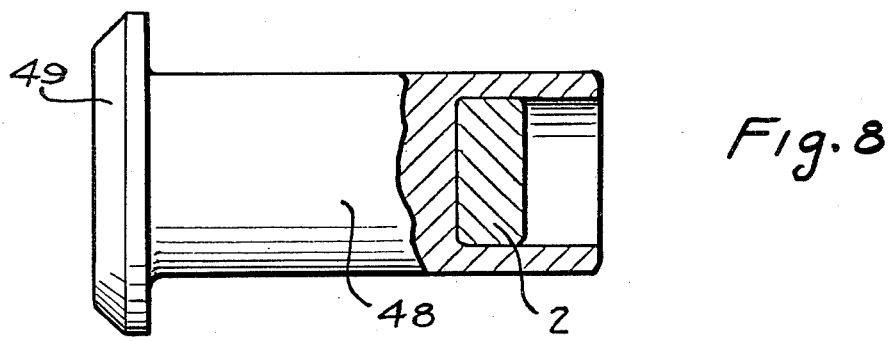
FIG. 8 is a sectional view of a protruded head-type fastener system according to the present invention.

FIG. 8 illustrates a protruded type rivet head 48 of the fastener system of the present invention, having a protruded head 49 in the pre-upset condition. This type performs in the same way as the flush-head type fastener system of FIG. 1.

FIGS. 9-11 show rivet 1 of FIG. 1 used with a different core pin 60. This core pin has an external, circularly cylindrical surface 61 for part of its length and a tapered portion 62 for the remainder. The tapered portion terminates at a circular, flat abutment surface 63 which faces away from base 54. The cylindrical surface 61 preferably makes a tight fit inside the recess so as to be held therein. An abutment surface 64 is formed at the other end of the core pin and is intended to abut base 54 of the recess. Various dimensional notations are supplied in FIGS. 9 and 11 which relate to dimensions which will later be supplied.

Dimension line 65 is intended to show the axial location of the base 54. Dimension lines 66 and 67 are intended respectively to show the location of the exposed back surface 68 (see FIG. 11) of the workpieces at minimum and maximum grip conditions. The other dimensional notations will be evident from an examination of the drawings.

FIG. 11 shows rivet 1 installed with core pin 60 in workpieces (objects). Only part of an object is shown in FIG. 11, it being understood that the assembly is intended to be as shown in FIG. 3. The upset head 69 in FIG. 11 is a more complete showing of the upset head intended to be formed with this invention. It represents a barrel-like collapse, resulting in a fold 70 as shown, to provide a button-shaped head with an outer diameter Z. However, depending upon the dimensions used, it is possible for a compression-upset head (i.e., an unfolded head formed of material expanded by compression without barreling collapse) to be formed more strictly in conformance with FIG. 3, depending entirely upon the length, wall thickness, and diameters of the tubular portion. A shorter and heavier-walled tubular end is more likely to form a compression-upset head end.

It is preferred that the head shown in FIG. 11 be attained in all embodiments of this invention, although this is not a necessary limitation. It will be observed that there has been a certain amount of head forming, in the sense of metal re-shaping, in the upset head 69 so that the outer face 71 of the head assumes the surface of forming face 72 of tool piece 15 (face 21 in FIGS. 1 and 2). The end of the upset head overlaps and embraces the tapered portion of the core pin and prevents it from falling out after the head is formed. Also, this retention provides the mutual reinforcement as heretofore discussed. For reasons later to be discussed, the inner tool piece 13 is kept from force transmission through the core pin when no substantial shank expansion is desired, and in fact, contact with the core pin is unnecessary. In another mode of installation, it may be extended axially along longitudinal axis 73 so as to contact the core pin, and exert forces through said core pin, during at least the terminal portion of the formation of the upset head, for purposes of shank expansion. This latter arrangement is used principally for initial clearance fit installations. A taper 90 on the inner tool piece 13 (as shown in FIG. 11) preferably adjoins a cylindrical section 91. Even when no substantial shank swelling force is to be exerted by piece 13, the cylindrical section 91 can be placed in the end of the upsettable portion of the rivet so as to locate the tool relative to the axis of the rivet. The taper avoids interference with the end of the rivet when it is set without application of axial force to the core pin.

FIGS. 12 and 13 are intended to show other types of core pins. In FIG. 12 there is shown a core pin 75 which has an external, circularly cylindrical surface 76, a tapered surface 77, and a second smaller diameter cylinengagement of the wall designated by diameter 12 within the wall designated by diameter 14 of the recess until an inner tool piece surface 22 contacts core pin surface 52.

The tooling system shown provides the required load sequencing of upset forming for a fastener system according to one method of this invention, wherein the tubular upset end is first formed and then, during at least the terminal portion of the upset forming, a compressive force is exerted on the solid shank through the core pin to swell the solid shank while finishing the formation of the upset head. As will later be disclosed, this system is adaptable to use in other setting techniques in which no compressive force is exerted on the core pin.

The outer tool piece 15 locates on the inner tool piece 13, and slides forward in a direction to upset the tubular upsettable portion 5. The resulting upset is that of a tubular collapse. In the course of this collapse, the hollow tubular upsettable end "barrels" out and folds to form the upset head. This is best shown in FIG. 11. This is not a compression-yield-formed head (although it could be, depending on the relative dimensions of the tubular upsettable portion), but is instead a collapsed bulb-shaped structure having an outer diameter Z (FIG. 11).

The inner tool piece 13 is held in its initial position against shoulder 16 by an elastomer or a spring 17. Distance $h_2$ is predetermined, relative to dimension $h_1$.

As illustrated in FIG. 2, forces $F_1$ are applied by the tooling 18 and 19 at the upsettable head end and at the preformed head end, respectively. The preformed head 50 is preferably of crown shape to concentrate the load through the center of the rivet shank. Such a crown shape can also be applied to the protruded head of FIG. 8. The elastomer 17 is compressed, and tool piece 18 advances toward inner tool piece 13 while forcing the body 15 to upset the tubular upsettable end 5, thereby to form an upset head 20. When $h_2$ decreases to zero, i.e., when tool surfaces 24 and 23 meet, then surfaces 21 and 22 on the outer and inner tool pieces apply loads simultaneously to the upset head surface 25 and to core pin surface 52, which compresses the shank. This is to say that in the terminal portion of the process of the head-forming operation, the tool simultaneously applies an end load to the solid shank through the core pin which tends to swell the shank, and which completes the upset head. As previously mentioned, the shank-swelling is an optional technique, and can be eliminated by appropriate modification or adjustment of the tooling.

Because of the high strength of the core pin, the load applied to the core pin to swell the solid shank is carried axially directly through it to the solid rivet shank, without causing an excessive diametrical expansion of the core pin itself. The forces $F_1$ continue to increase, and the rivet shank diameter expands to fill and to expand hole 8 until the desired interference fit is obtained, usually in the approximate range from about 0.002 to 0.010 inch. Interference fit, as the term is used herein, is defined as the difference between the diameter 11 of the rivet shank, in its relaxed condition after upset, and the diameter 8 of the hole as it existed before the rivet was placed in the hole.

In the embodiment of FIG. 1, the core pin has equal corner radii 26 and 28 (see FIG. 2) at its axially opposite faces, which radii are substantially equal to the fillet radius 27 of the recess, so that the core pin can reversibly be installed in the recess. This also permits flow of upset head material 53 to enclose the corner radius 28, thereby incorporating a preferable interlocking means between the core pin and the upset rivet. Identity of construction at both ends of the core pin is not necessary. As can be seen from an examination of FIGS. 9 and 10, a taper can be provided on only one end of the core pin, and such a core pin would not be reversible, because its ends are not identical.

It can be seen that core pin 2 laterally reinforces the tubular upsettable end during the upset formation of the head, and prevents internal buckling or eccentric formation of the head. By "reinforcement" is meant that it is present to form a bulwark against internal buckling, and also forms a bulwark preventing the upsettable end of the rivet from moving laterally to form an eccentric or off-center head. However, the entire area of the outer wall of the core pin need not be in contact with the upsettable tubular portion, although, depending on dimensions, it could be. The core pin also reinforces the upset head by the forces P after the assembly has been completed. These forces P prevent rotation or roll over of the upset head in the direction S under the tensile separating forces $F_2$. Thus, the resulting supported upset head is made substantially as strong as the preformed head. It will also be seen that the core pin can transmit an upsetting load for expanding (swelling) the solid shank directly to the solid shank, causing diametral expansion of the shank, and resulting in an interference fit installation which substantially extends the fatigue life of the structural joint. The usage of this expansion feature is optional. The rivet has substantial utility even without the said expansion.

The core pin has the important additional function of permitting a given length of fastener to be used for a substantial range R of panel thickness variation (grip range). Grip range is defined as the difference in thickness, or grip, from $g_1$ maximum grip to $g_2$ minimum grip, as illustrated in FIG. 3.

The normally commericially acceptable grip range R in which a fastener must perform is 1/32 inch. For a ¼ inch diameter fastener, this range would be ⅛ of its shank diameter. This grip range R is shown in approximate relative scale in FIG. 3, which is the difference between the maximum and minimum grip $g_1$ and $g_2$ shown above and below the centerline, respectively, in which a fastener of a given length L must perform. It is instructive to note that with the instant invention, in all but the smaller sizes (about 5/32 inch shank diameter and less), the grip range attainable is at least 1/16 inch, about double that which has formerly been regarded as acceptable. In said smaller sizes, the grip range will be at least 1/32 inch. A fastener of given length must be satisfactory for use with a substantial range of increment or grip variation, since sheet thicknesses may vary within manufacturing tolerances. Also, tapered sheets are sometimes used which would change the grip along the length of the rivet pattern, and it is clear that a different fastener length could not practicably be used to accommodate every minute change in work thickness.

The base 54 of the recess is disposed below the panel rear surface 31 (sometimes called the "exposed surface" of the workpieces) by the distance R, in the maximum grip condition, and does not stand above surface 32 in the minimum grip condition. This is to say that in a proper installation, base 54 will be disposed at the back surface of the workpiece, or below it, but never above it. In order to bottom the upset head against the surface 32 without cracking the head, it is necessary for only tubular upsettable material, and not solid shank material, to project beyond the surface 32.

The shape of the upset head will vary somewhat, but within permissible limits, when the identical rivet is formed at various of its grips within its grip range. This is because a given amount of volume of pre-upset length $h_3$ of the tubular upsettable portion will project beyond the surface 32, which varies with the individual grip. Nevertheless, a useful head will be obtained at any grip within the established grip range. A principal criterion for an acceptable head is that the ratio Z/D (see FIGS. 9 and 11), i.e., the ratio between the outer diameter of the upset head as formed and the outer diameter of the solid shank, should be at least as great as about 1.3. The core pin is a vital component in allowing the hollow end rivet to be insensitive to a wide range of grip variations, while still providing the function of shank expansion.

The aforesaid functions of the core pin constitute an important feature of this invention, and serves to distinguish this invention from conventional single-piece hollow end rivets. This will be evident from the subsequent descriptions and Figs. wherein conventional rivets are discussed.

FIG. 4 shows a conventional hollow end rivet 33 with conventional head upset tooling 34 and 35, before and after upset, above and below the centerline, respectively. The recess depth d for obtaining the necessary upset head volume is indicated. Without core pin support, internal buckling or eccentric forming of the hollow end 5' can easily result, as indicated by dashed lines. Even if the head 36 is upset satisfactorily, as shown below the centerline, it is unsupported from within and can easily yield in the direction S (buckling inwardly) under the axial separative forces $F_2$. It can also be seen that force $F_1$ cannot be transmitted to expand the center portion of the shank.

FIG. 5 shows a conventional hollow end rivet 33, before and after upset, above and below the centerline, respectively. The thickness $g_3$ was chosen such that, after upset, the tool surface 37 can contact rivet surface 38 to expand the rivet shank inner portion. Recess surface 39 is above surface 31 in an amount $h_4$ equal to the thickness of the upset head 40. The hollow portion is forced over the extended portion of solid shank the distance $h_4$, and cracking of the upset head as indicated by line 41 can thereby easily result. Also, there is no internal support to prevent buckling of the hollow shank end during upset.

FIG. 6 shows the conventional hollow end rivet 33, before and after upset, above and below the centerline, respectively. Modified conventional upset head tooling 42 has a nose section 43 of length $h_5$ which, after upset heading, contacts surface 44 to cause shank expansion. It can be seen that only partial support of the hollow end during upset is achieved, and that again the upset head is not internally supported and will easily yield under the axial tensile forces $F_2$, in the direction S.

FIG. 7 illustrates another form of the present invention, indicating before and after upset conditions, above and below the centerline, respectively. The circumferential groove 46 of core pin 45 presents a means for interlocking the upset hollow end surface 47. Material of the hollow end enters the groove to form a lock.

FIG. 8 illustrates a protruded type rivet head 48 of the fastener system of the present invention, having a protruded head 49 in the pre-upset condition. This type performs in the same way as the flush-head type fastener system of FIG. 1.

FIGS. 9-11 show rivet 1 of FIG. 1 used with a different core pin 60. This core pin has an external, circularly cylindrical surface 61 for part of its length and a tapered portion 62 for the remainder. The tapered portion terminates at a circular, flat abutment surface 63 which faces away from base 54. The cylindrical surface 61 preferably makes a tight fit inside the recess so as to be held therein. An abutment surface 64 is formed at the other end of the core pin and is intended to abut base 54 of the recess. Various dimensional notations are supplied in FIGS. 9 and 11 which relate to dimensions which will later be supplied.

Dimension line 65 is intended to show the axial location of the base 54. Dimension lines 66 and 67 are intended respectively to show the location of the exposed back surface 68 (see FIG. 11) of the workpieces at minimum and maximum grip conditions. The other dimensional notations will be evident from an examination of the drawings.

FIG. 11 shows rivet 1 installed with core pin 60 in workpieces (objects). Only part of an object is shown in FIG. 11, it being understood that the assembly is intended to be as shown in FIG. 3. The upset head 69 in FIG. 11 is a more complete showing of the upset head intended to be formed with this invention. It represents a barrel-like collapse, resulting in a fold 70 as shown, to provide a button-shaped head with an outer diameter Z. However, depending upon the dimensions used, it is possible for a compression-upset head (i.e., an unfolded head formed of material expanded by compression without barreling collapse) to be formed more strictly in conformance with FIG. 3, depending entirely upon the length, wall thickness, and diameters of the tubular portion. A shorter and heavier-walled tubular end is more likely to form a compression-upset head end.

It is preferred that the head shown in FIG. 11 be attained in all embodiments of this invention, although this is not a necessary limitation. It will be observed that there has been a certain amount of head forming, in the sense of metal re-shaping, in the upset head 69 so that the outer face 71 of the head assumes the surface of forming face 72 of tool piece 15 (face 21 in FIGS. 1 and 2). The end of the upset head overlaps and embraces the tapered portion of the core pin and prevents it from falling out after the head is formed. Also, this retention provides the mutual reinforcement as heretofore discussed. For reasons later to be discussed, the inner tool piece 13 is kept from force transmission through the core pin when no substantial shank expansion is desired, and in fact, contact with the core pin is unnecessary. In another mode of installation, it may be extended axially along longitudinal axis 73 so as to contact the core pin, and exert forces through said core pin, during at least the terminal portion of the formation of the upset head, for purposes of shank expansion. This latter arrangement is used principally for initial clearance fit installations. A taper 90 on the inner tool piece 13 (as shown in FIG. 11) preferably adjoins a cylindrical section 91. Even when no substantial shank swelling force is to be exerted by piece 13, the cylindrical section 91 can be placed in the end of the upsettable portion of the rivet so as to locate the tool relative to the axis of the rivet. The taper avoids interference with the end of the rivet when it is set without application of axial force to the core pin.

FIGS. 12 and 13 are intended to show other types of core pins. In FIG. 12 there is shown a core pin 75 which has an external, circularly cylindrical surface 76, a tapered surface 77, and a second smaller diameter cylindrical surface 78. The functions of surfaces 76 and 77 are identical to those of surfaces 61 and 62 in FIG. 9. The additional cylindrical surface 78 can serve to provide additional guidance to the tip end of the tubular upsettable portion as it moves inwardly while the head is formed. The tapered portion 77 represents a close approximation to the path which this end would take, unsupported, when the tube collapses. The dimensions of the core pin of FIG. 12 will be selected to achieve that objective.

A small, conical projection 79 is shown formed on the end of core pin 75. In some embodiments of the invention, where the rivet will be formed by a reverse extrusion or hitting technique, the punch used for production of the recess will often have small draft angles and a similar projection. It is not necessary that the core pin make full surface-to-surface contact with base 54, but if such is desired, then a projection substantially identical to the shape of the base can be provided. For reasons yet to be discussed, initial full-area surface-to-surface contiguity between the abutment end of the core pin and the base of the recess is not necessary.

FIG. 13 shows another shape of core pin 80 which has a pair of cylindrical surfaces 81, 82 spaced apart by a tapered surface 83. The difference between this construction and that of FIG. 12 is merely the difference between the axial lengths of the two cylindrical surfaces. This does illustrate, however, that should it be desired to retain the core pin more firmly in the rivet, it may be done by swaging the tapered upsettable portion 84 to embrace the smaller cylindrical surface 82. The resulting joggle 85 will retain the core pin.

In considering the criteria and utility of this rivet system, it is instructive to consider the four basic modes for installing it:

| | | |
|---|---|---|
| 1. | No substantial expansion of shank | Initial press fit |
| 2. | No substantial expansion of shank | Initial net or clearance fit |
| 3. | Substantial expansion of shank (by core pin) | Initial press fit |
| 4. | Substantial expansion of shank (by core pin) | Initial net or clearance fit |

In modes 1 and 2 there is no substantial expansion of the shank which would tend to create an interference or to increase an interference already present. Such a construction will be accomplished by using the tooling in the condition shown in FIG. 11, where only the outer tool piece 15 works the rivet so as to form the upset head, and no axial force is exerted by the inner tool piece against the core pin sufficient to cause substantial swelling of the solid shank. Of course, there will be some shank expansion as a consequence of forces exerted to upset the head, even though there is no compressive endwise force exerted directly on the core pin by a tool, because at least some force will be transmitted to the shank, although not by direct application of force to the core pin. However, such shank expansion as may be caused by the force used to upset the head is of less importance and of a lesser magnitude than the shank expansion which is caused by application of a substantial force directly upon the core pin by the tooling. When the term "shank expansion" is referred to herein, it is intended to refer to an expansion caused by exertion of force directly on the core pin by the tooling, and thereby upon the solid portion of the shank through forces applied to the core pin and by it to the solid shank at the base, rather than indirectly on the shank through the material of the upset head.

In modes 3 and 4 there is a substantial expansion of the solid shank. In mode 3, an initial press fit (i.e., an interference fit) is already formed between the shank of the unset rivet and the bounding surface of the hole in which it is to be installed, which is increased when the shank is enlarged by the endwise forces exerted on the core pin. In mode 4, when one starts with an initial net or clearance fit, the shank enlargement results in an interference of the amount determined by the force exerted on the core pin. It is instructive to observe that the amount of shank expansion is largely dependent upon the force level applied to the solid shank. The upset head is substantially fully formed by the time a force is exerted upon the core pin. The expansive forces are exerted on the core pin simultaneously with at least the terminal portion of the formation of the upset head so that, as the shank is enlarged, and therefore somewhat shortened, the outer tool piece follows along and continues to form the upset head so as to create a tightly-clamped joint.

In the illustrative example given in the tables attached hereto, the rivet and core pin dimensions principally relate to mode 1. Persons skilled in the art will have no difficulty in making such small adjustments in dimensions as might be required to adapt the construction to usage wherein a substantial expansion of the shank is desired in addition to the formation of the upset head. All four of these modes provide important advantages. Mode 1 is advantageous in that it can readily be utilized with automatic tooling which expeditiously and rapidly can press fit rivets into properly-sized holes, and then the upset head can be formed with the moderate forces required for that purpose, without causing any substantial swelling of the shank.

Mode 2 is similarly useful. It is perhaps easier to use for manual operations because of the greater ease of insertion of the rivet into the holes. However, this mode will be useful only in constructions wherein a final net or clearance fit of the shank in the hole is tolerable. There are many such installations, and in view of the strength of the upset head in this embodiment, a substantial application of this mode can be anticipated.

Mode 3 has the advantages of mode 1, plus the additional advantage of the substantial expansion of the shank, should a larger interference be desired.

Mode 4 has a substantial advantage in that, starting with a net or clearance fit wherein the rivet can readily be inserted into the holes in the workpiece, a substantial expansion of the shank can thereafter be produced to result in an interference fit joint.

The forming forces required for mode 1 are considerably lower than those required to form conventional upset rivets having a strong upset head. For example, to achieve an upset head with mode 1, having a ratio of diameter of the upset head to that of shank Z/D equal to 1.3, it has been found that about 6,000 pounds of compressive force is needed to set a high-strength titanium alloy rivet of 5/32 inch diameter. The forces for 3/16, ¼, 5/16 and ⅜ inch rivets are respectively 8,000, 15,000, 22,000 and 29,000 pounds. The force needed to upset a comparable solid rivet of the same material is about twice these loads.

Analysis of the foregoing modes and their usages indicates that this rivet finds good use in joints wherein it is advantageous for the unit strength of the material of the rivet to be greater than the unit shear strength of the workpiece material. Accordingly, the material of this rivet is said to be of "high strength". As a practical matter, especially in aerospace installations, this means unit shear strength in excess of about 40,000 psi. However, in the majority of installations, it will be on the order of 90,000 to 100,000 psi. These strengths are in excess of those found, for example, in aluminum structures. Examples of suitable high-strength materials are as follows:

| Material | Unit Shear Strength, psi |
| --- | --- |
| Monel metal | About 50,000 |
| Beta Titanium Alloys: | |
| 8-8-2-3 | 90,000–100,000 |
| Beta C | 90,000–100,000 |
| Beta III | 90,000–100,000 |
| Steel Alloy: | |
| A-286 | 90,000–100,000 |

Of course, other materials may be used instead, the foregoing merely being examples and not limitations.

The core pin may advantageously be made of titanium alloy 6AL-4V treated to the proper strength level for use with the said titanium alloys in rivets. The core pin may be made of A-286 steel alloy treated to the proper level for use with the rivet of the same material. Since the core pin is not to change shape during upset, extremely hard ceramic material may even be used, such as alumina.

The criterion for the selection of material for the core pin relative to the material of the rivet is that the material of the core pin must have a compression yield strength at least substantially as large as that of the rivet material.

The following table of dimensions is given to enable a person skilled in the art to make the rivet shown in FIG. 9. The suggested materials of construction for such rivet are:

for the rivet, titanium alloy 8-8-2-3 with a unit shear strength of approximately 95,000 psi;

for the core pin, the same alloy treated to a higher strength level, perhaps about 100,000 psi.

The dimensions in the table are in inches. The dash lines are nominal, rivet shank diameters expressed as a multiple of 1/32 inch.

When using the various ratios as criteria, the following ranges are suitable, the values given in the table being optimum for the example:

E/D less than about 1.5, preferably between about 1.0 to about 1.2;
E/C about 1.7 to about 1.8;
C/D about 0.6 to about 0.7;
F/E about 0.4 to about 0.6;
F/D about 0.48 to about 0.58.

The base 54 will not ordinarily be more than 0.075 inch from the surface of the workpice against which the upset head bears in the maximum grip condition, and for a normal grip range of 1/16 inch. This will insure that the base will be about 0.013 inch below the workpiece in the minimum grip condition.

TABLE

| DASH NO. | NOM. DIA. | D DIA. | C DIA. | E | F | A | X | Y |
| --- | --- | --- | --- | --- | --- | --- | --- | --- |
| −5 | 5/32 | .163 | .103 | .179 | .086 | .093 | .044 | .013 |
| −6 | 3/16 | .189 | .119 | .207 | .099 | .108 | .075 | .013 |
| −8 | ¼ | .249 | .157 | .274 | .132 | .142 | .075 | .013 |
| −10 | 5/16 | .3115 | .196 | .343 | .165 | .178 | .075 | .013 |
| −12 | ⅜ | .374 | .236 | .411 | .197 | .214 | .075 | .013 |

| DASH NO. | E/D | E/C | C/D | F/E | F/D |
| --- | --- | --- | --- | --- | --- |
| −5 | 1.1 | 1.738 | .630 | .480 | .528 |
| −6 | 1.1 | 1.740 | .630 | .478 | .524 |
| −8 | 1.1 | 1.745 | .630 | .481 | .530 |
| −10 | 1.1 | 1.750 | .630 | .481 | .530 |
| −12 | 1.1 | 1.740 | .630 | .479 | .526 |

The core pin preferably makes a net or light interference fit in the recess so it will not fall out when the rivet assembly is handled before installation. In the table, and in FIG. 9, it will be noted that the dimension X is the distance from the maximum grip line (i.e., the exposed surface of the workpiece at the upset end) and the base 54 of the recess, and that dimension Y is the analogous distance from the minimum grip line.

Figure 23:
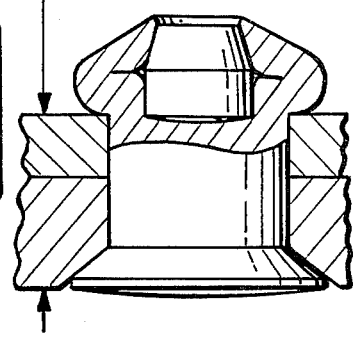
FIG. 23 is another view of the preferred embodiment of the invention closer to scale than that shown in FIG. 11.

FIG. 23 is provided to illustrate substantially to scale the minimum grip condition of the shortest practicable length of rivet of a given diameter. This will illustrate to persons skilled in the art many of the advantages of the invention, even better than the other Figs., which are more suitable to the disclosure of dimensions and criteria.

The ratios E/D, E/C and C/D are of importance to the function of this rivet. It appears that rivets according to this invention which are not made in such proportions do not function optimally, and frequently do not function at all. These ratios are independent of the rivet materials used and, when utilized, result in a useful rivet system. These ratios relate principally to the provision of an adequate volume of material for forming an acceptable upset head over the full grip range. These ratios can vary somewhat from the precise numbers given, but experience has shown that constructions which incorporate them provide a suitable rivet.

In accordance with established aircraft design criteria, the ratio Z/D will be at least about 1.3. An upset head which does not provide at least this ratio is not generally acceptable in the aircraft industry.

The usual and established grip of a rivet is from about 0.5 D to 4.0 D.

The criterion for determining the axial length of the core pin is that the core pin must be long enough that a substantial portion of it is located where it can buttress the inside diameter of the upset head and thereby prevents the rotation of the upset head (in a rolling sense). That is, it prevents it from being folded inwardly under tensile load, which inward folding would reduce its restraint against axial separative forces.

While it appears to be best practice for the abutment surface of the core pin used in the embodiment of FIGS. 1–13 initially to make a full surface-to-surface contact with the base of the recess in the pin, this is not a necessary limitation. Because the core pin is made of material substantially at least as strong as, or stronger than, the rivet material, it will be found that when pressing the core pin against a non-matching surface of the base, the applied pressure over a minimal area of contact will cause yielding of the rivet material, and consequently a larger contact area will develop between the rivet and the core pin. Finally, substantially all, and usually all, of the two surfaces will be in full bearing contact with one another. Therefore, it is possible to have projections on the core pin, such as in FIG. 12, abutting initially against a relatively flat base surface, or for a core pin with the abutment surface in FIG. 12 abutting against an even more deeply recessed base surface in the construction of FIG. 9.

When the shank is to be enlarged, the technique is to set the major portion of the upset head, and then, while completing it (i.e., the "terminal portion" of the head-forming operation), to apply pressure to the core pin to swell the solid shank. It will then be seen that the amount of interference formed is simply a function of the applied end load. This is the technique shown in FIGS. 1–3. Should shank-swelling of a substantial amount not be desired, then the technique of FIG. 11 is used, where the inner tool is withdrawn from contact with the core pin, and only the outer tool is applied to set the rivet. However, it frequently is convenient to use the inner tool portion as a means to center and guide the outer tool portion relative to the tubular end. In such event, the tool is modified so that the inner tool is initially embraced by the outermost part of the tubular end, but is proportioned so that it does not impede the formation of a correct upset end.

An examination of the drawings will indicate that the shank is solid for the major proportion of its length which is in shear-bearing relationship. This is most evident in FIG. 8 which shows a protruding head rivet, but it is also true in the counter-sink or flush-head type where some shear load is in fact taken by the head. The depth Y, which is the minimum amount by which the base will be within the workpiece, and the dimension X, which is the largest amount, are in fact relatively minor portions of the rivet length, and they exist to be certain that only tubular structure projects beyond the workpiece. This will prevent the situation of FIG. 5 from occurring, wherein head cracking can occur.

FIGS. 14–16 and 20–22 illustrate other embodiments of the invention. They differ from the embodiment of FIGS. 1–13 in that initially the core pin does not bear against the base of the recess. Also, in the embodiment of FIGS. 14–16, the core pin includes a flange through which axial upsetting forces are exerted on the end of the tubular upsettable portion.

Figure 14:
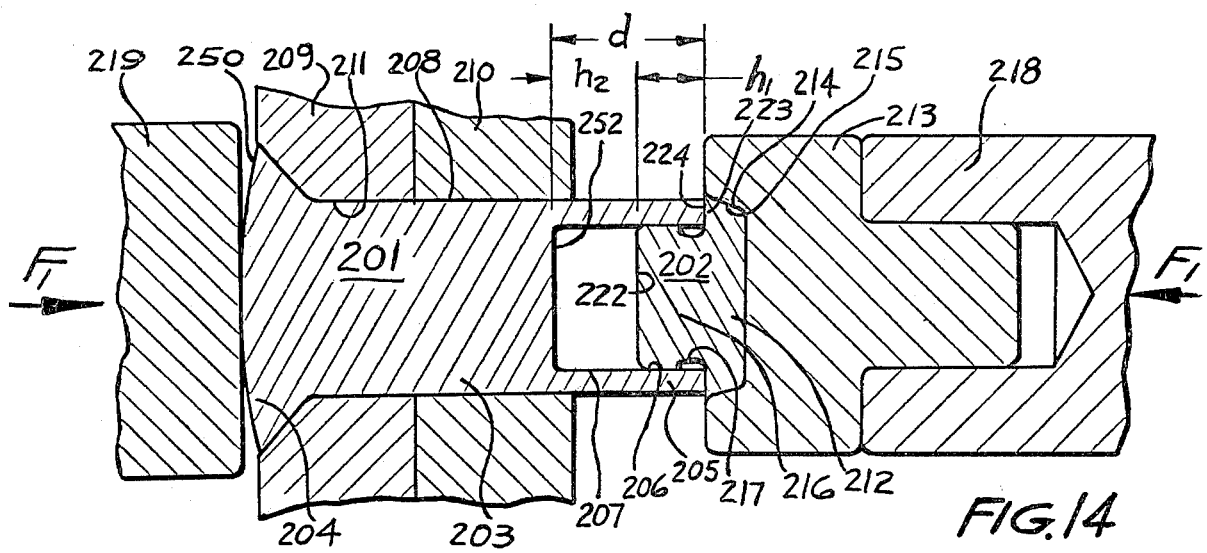
FIG. 14 is a sectional view of another embodiment of a flush-head type fastener according to the present invention with upset tooling, prior to upset forming.

FIG. 14 illustrates another embodiment of a flush-head type fastener according to the present invention, together with upset tooling, prior to upset forming. The fastener is comprised of a rivet 201 and a core pin 202. The rivet has a solid shank 203, a preformed head 204, and a tubular upsettable portion 205. Portion 205 has a recess of predetermined length d to obtain the desired upset head which is a function of the volume of material in the hollow end. The core pin 202 is comprised of a preformed head 212 and a shank 216 having an annular locking groove 217. The outer wall of core pin 202 has a diameter 206, such that the core pin can be pre-assembled, preferably by press-fitting into the internal cylindrical wall 207, and is located by the shoulder 223 in abutment with rivet end face 224. This pre-assembly permits handling the fastener as though it were a single-piece fastener, thereby decreasing the installation handling costs and complexity.

The two-piece assembled rivet is installed into the hole 208, common to the structural panels 209 and 210. Shank diameter 211 is preferably smaller than the diameter of hole 208 to facilitate installation, although press-fitting is permissible. Core pin 207 has a shank length $h_1$ having a front face 222 located a gap distance $h_2$ from the rivet shank face 252. The upsetting tool piece (rivet set) 213 has a forward recessed portion preferably having a conical surface 214 which engages a similarly shaped core pin surface portion 215, thereby coaxially locating the upset tool 218 and the rivet prior to upset forming.

Figure 15:
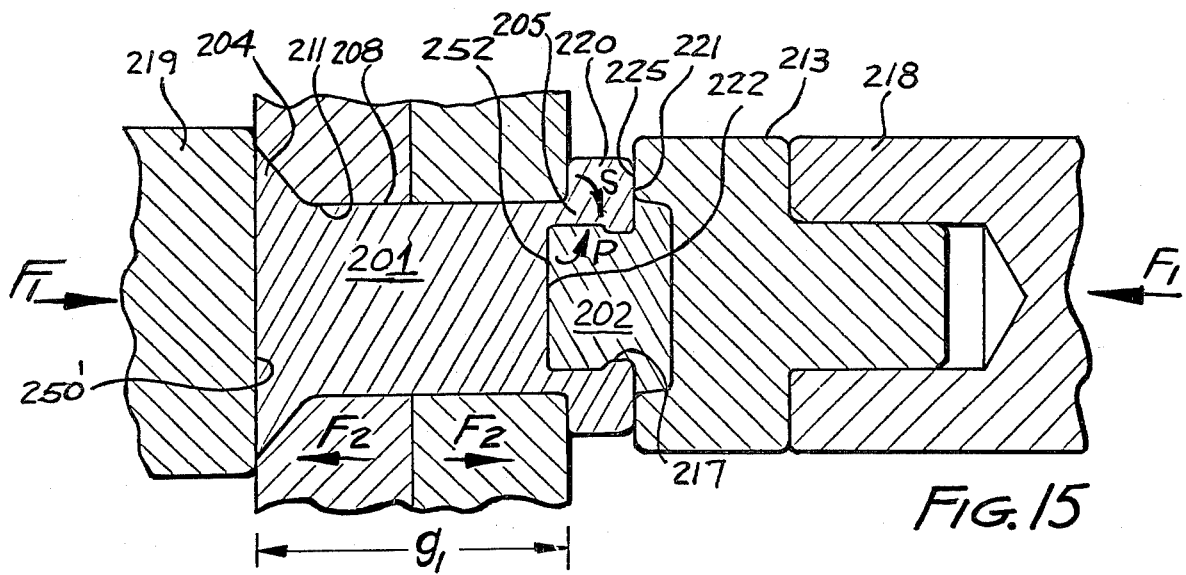
FIG. 15 is a sectional view of the fastener and tooling of FIG. 14 after upset forming.

As illustrated in FIG. 15, forces $F_1$ are applied by portion 213 and 219 of the tooling at the upset head end and preformed head end, respectively. The preformed head is preferably terminated by crown-shaped surface 250 (FIG. 14) to concentrate the load through the center of the rivet shank. Core pin 202 advances toward the base 252 tool piece while upset forming the tubular upsettable portion 205 to form an upset head 220. When $h_2$ decreases to zero, i.e., when core pin surface 222 and base 252 meet, the joint is formed. Continued increased loading will cause the core pin to axially compress the shank, and will continue to form the upset head. Therefore, the shank expansion occurs during the terminal portion of the upset-head forming process.

Because of the high strength of the core pin, the upset load is carried directly through to the rivet shank without excessive diametral expansion of the core pin, because the core pin does not appreciably expand. The forces $F_1$ continue to increase, and the rivet shank diameter 211 expands to fill and expand the hole 208 until the desired interference fit for a radial expansion shank is obtained, i.e., in the approximate range of from 0.002 to 0.010 inch. It can be seen that rivet material from shank end 205 has flowed into core pin groove 217 during upset forming, thereby mechanically interlocking core pin 202 with rivet 201.

Just as in the embodiment of FIGS. 1–13, the core pin 2 reinforces the tubular upset portion 205 during the upsetting of the head to prevent buckling or eccentric forming during upset. After setting, the core pin reinforces the upset head by the forces P, which prevents rotation and yielding of the upset head in the direction S under the tensile separating forces $F_2$. Thus, as in the other embodiments, the supported upset head 220 is made substantially as strong as the preformed head. It is also seen that the core pin transmits the upset load to the solid shank, causing diametral expansion of the shank, resulting in an interference fit installation which substantially extends the fatigue life of the structural joint.

Figure 16:
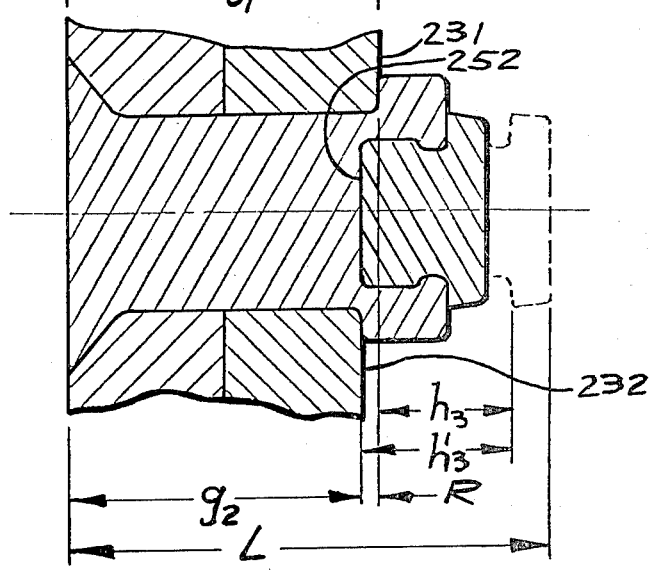
FIG. 16 is a sectional view of the fastener of FIG. 14, before and after upset forming, with different panel thicknesses.

Also, as in FIGS. 1–13, the embodiments of FIGS. 14–22 provide in the core pin the important additional function of permitting a given length of fastener to be used for a range R of panel thickness variation defined as the difference in thickness or grip from $g_1$ maximum grip, to $g_2$ minimum grip, as illustrated in FIG. 16. The minimum normally acceptable grip range R in which a fastener must perform is 1/32 inch. For a ¼ inch diameter fastener, this grip range would be ⅛ of the shank diameter. This grip range R is shown in approximate relative scale in FIG. 16, which is the difference between the maximum and minimum grip $g_1$ and $g_2$ shown above and below the centerline, respectively, in which the fastener of a given length L must perform. The fastener must be satisfactory for a range of increment or grip variation, since sheet thickness may vary within manufacturing tolerances. Also, tapered sheets are sometimes used which would change the grip along the length of the rivet pattern, and it becomes clear that a different fastener length could not practically be used to accommodate every minute change in thickness. It can be seen that the recess bottom surface 252 is below the panel rear surface 231 the distance R, in the maximum grip condition, and does not fall above surface 232 in the minimum grip condition. It is necessary to have only hollow shank upsettable materials, and not solid shank material, extending past the structural surfaces. After forming an upset head under these grip conditions, it can be seen, because of different grips $g_1$ and $g_2$ and a given predetermined volume of the extended, pre-upset lengths $h_3$ and $h_3'$ for the maximum and minimum grip conditions respectively, the shape of the upset head varies, but within permissible limits. It can be seen that the core pin is a vital component in controlling the upset head, permitting the fastener to be substantially insensitive to grip variation, while still providing the function of shank expansion.

Figure 17:
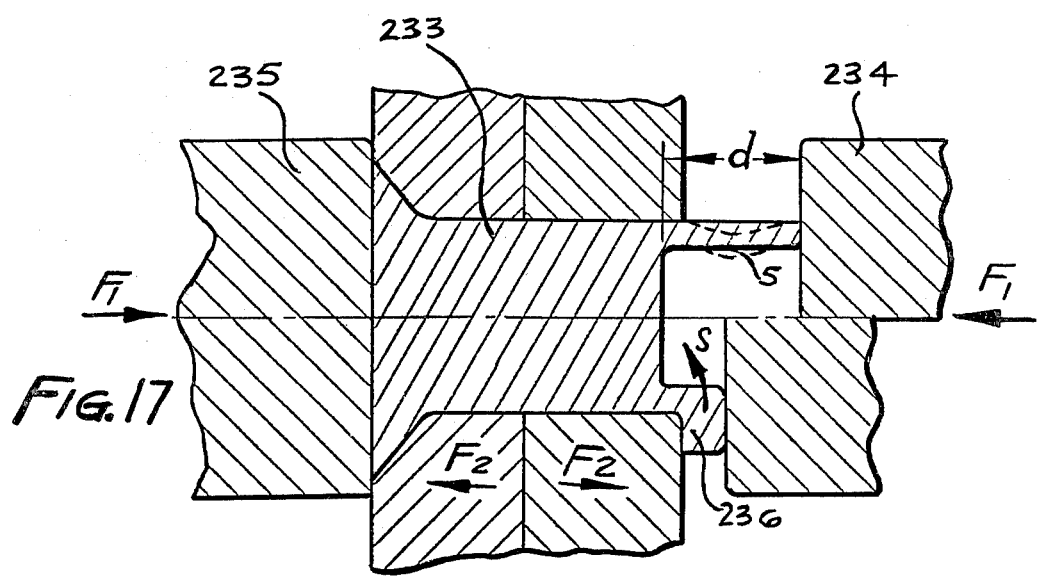
FIG. 17 is a sectional view of a conventional hollow end rivet and upset tooling, both before and after upset forming.

FIG. 17 shows a hollow end rivet 233 with conventional head upset tooling 234 and 235, before and after upset, above and below the centerline, respectively. The recess depth d for obtaining the necessary upset head volume is indicated. Without core pin support, buckling or eccentric forming of the hollow end 205' can easily result, as indicated by dashed lines. Even if the head 236 is upset satisfactorily, as shown below the centerline, it is unsupported from within and can easily yield in the direction S under the axial forces $F_2$. It can also be seen that force $F_1$ cannot be transmitted to expand the shank.

Figure 18:
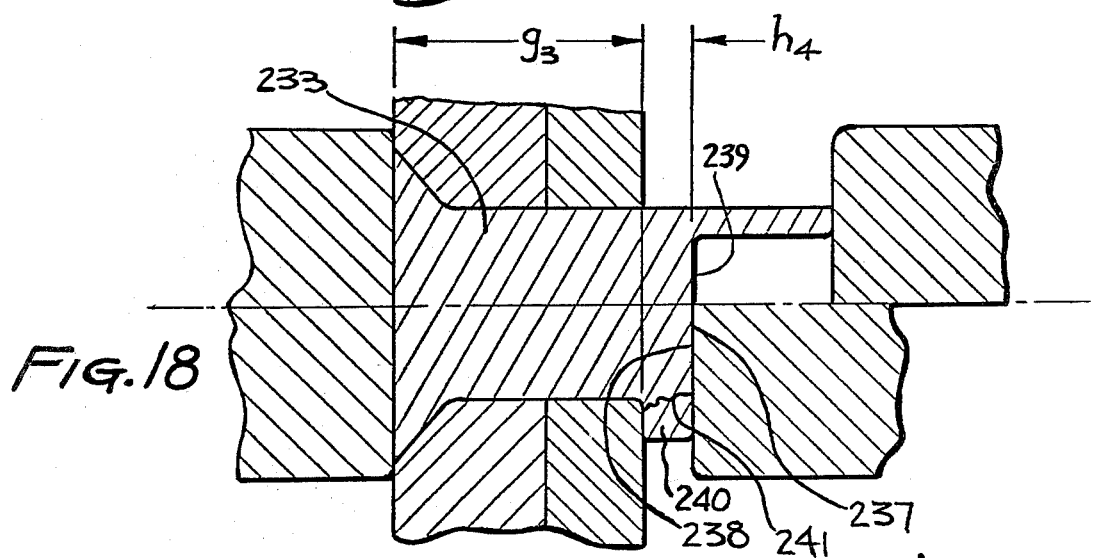
FIG. 18 is another sectional view of a conventional hollow end rivet before and after upset.

FIG. 18 shows the rivet 233, before and after upset, above and below the centerline respectively. The thickness $g_3$ was chosen such that, after upset, the tool surface 237 can contact rivet surface 238 to expand the rivet shank. Recess surface 239 is above surface 231 an amount $h_4$ equal to the thickness of the upset head 240. The hollow portion is forced over the extended portion of solid shank the distance $h_4$, and cracking of the upset head as indicated by line 241 can thereby easily result. Also, there is no internal support to prevent buckling of the hollow shank end during upset.

Figure 19:
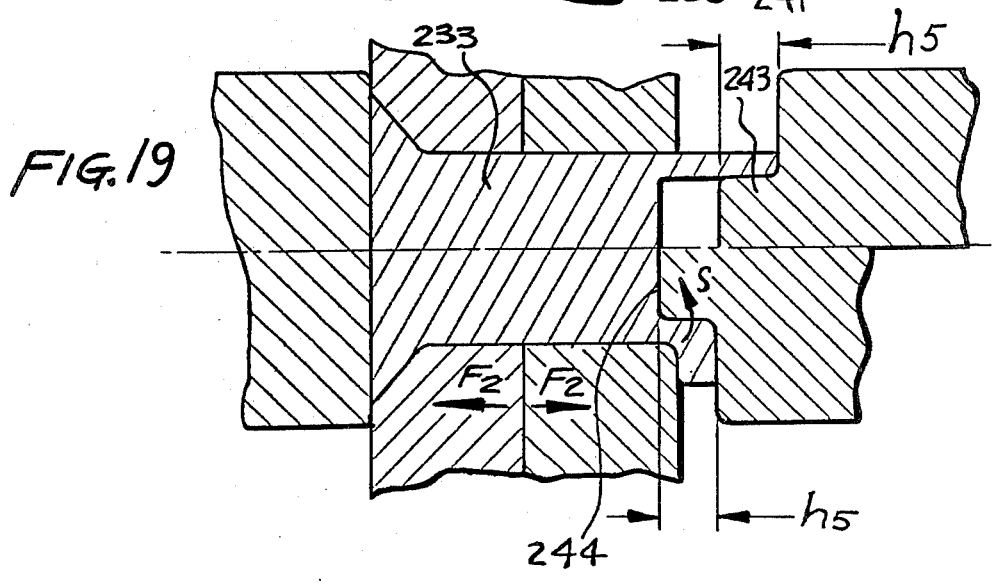
FIG. 19 is a sectional view of a conventional hollow end rivet and modified conventional upset tooling, both before and after upset forming.

FIG. 19 shows the hollow end rivet 233, before and after upset, above and below the centerline, respectively. Modified conventional upset head tooling 242 has a nose section 243 of length $h_5$ which, after upset heading, contacts surface 244 to cause shank expansion. It can be seen that only partial support of the hollow end during upset is achieved, and that again the upset head is not internally supported and will easily yield under the axial tensile forces $F_2$, in the direction S.

Figure 20:
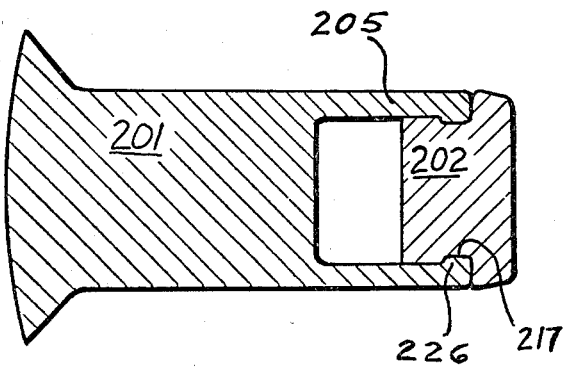
FIG. 20 is a sectional view of another form of the fastener of the present invention.

FIG. 20 illustrates an alternate form of the present invention wherein the core pin and rivet are mechanically interlocked at pre-assembly prior to rivet upset. Surface portion 226 of the tubular upsettable portion 205 of rivet 201 is swaged or otherwise formed into the locking groove 217 of core pin 202.

Figure 21:
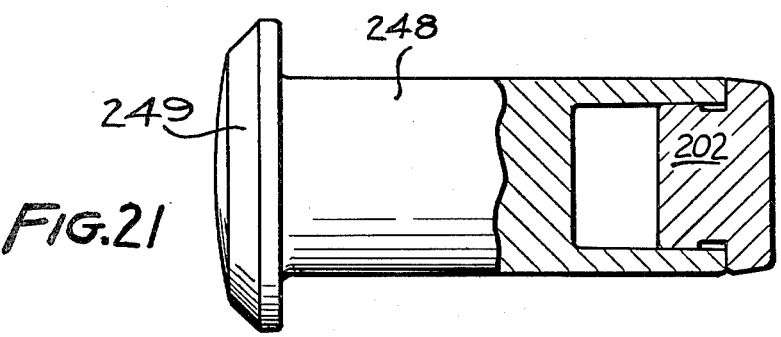
FIG. 21 is a sectional view of a protruded head type fastener according to the second embodiment (FIG. 14) of the invention.

FIG. 21 illustrates a protruded head type rivet 248 of the fastener of the present invention having protruded head 249, in the pre-supset condition. This type performs in the same way as the flush-head type fastener of FIG. 1, the only difference being in the shape of the preformed head.

Figure 22:
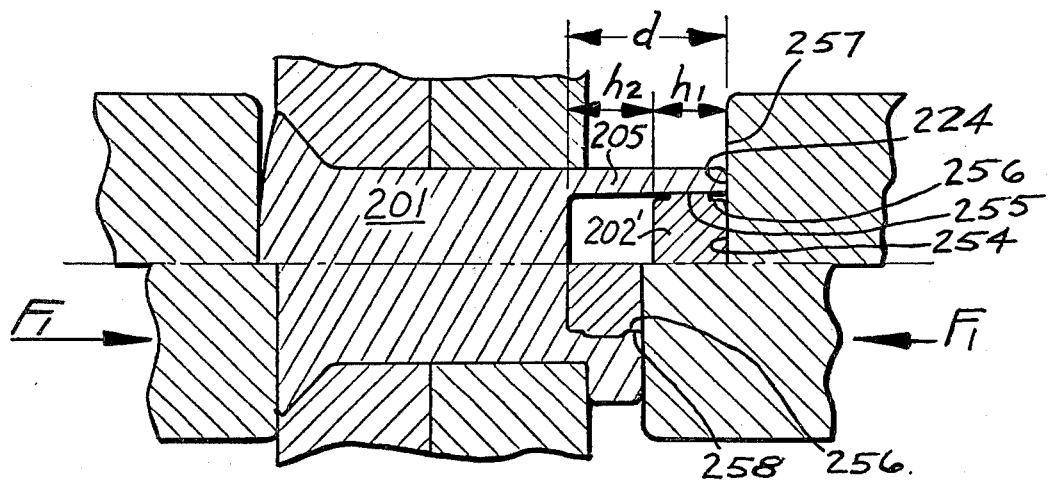
FIG. 22 is a sectional view illustrating an alternate form of the fastener of the present invention, both prior to rivet upset and after rivet upset.

FIG. 22 is a composite view of another alternate form of the present invention before rivet upset (shown above the centerline) and after rivet upset (shown below the centerline). It can be seen that the rivet is the same as the basic rivet configuration presented in FIG. 14. However, the core pin 202' (FIG. 22) differs from core pin 202 (FIG. 14) in that it does not have a preformed head for concentrically locating the upset means as the core pin of FIG. 14. However, upset means having a flat surface 257 can be used, such upset means being preferred when pneumatic hammers and bucking bars are used, whereas concentrically piloted upset means are preferred with portable squeeze tooling. Diameter 255 of core pin 202' is stepped down to surface 256 for locking the core pin after rivet upset. Locking of the core pin is shown by the rivet surface portion 258 which is formed around surface 256 after rivet upset. Chamfers or similarly stepped corners on the core pin can also be used in lieu of the preferred stepped diameters shown. It can be seen that the core pin 202' is symmetrical so as to permit reversible, pre-assembly installation into the rivet hollow end 205.

In the claims, reference is made to dimensional notations of FIG. 9. It is emphasized that this reference is not intended to limit the claims to the specific embodiment of FIG. 9. Instead, the dimensional criteria are applicable to similar dimensions of all of the embodiments.

The term "base" is used to connote the surface at the bottom of the recess. The surface can be, and preferably is, planar an normal to the axis of the rivet. However, as discussed above, it can also assume other shapes. The term is intended to connote that portion bounding the recess which lies radially inward from the internal cylindrical wall of the recess.

It is again emphasized that the end forces exerted on the end surface of the tubular upsettable portion are primarily intended to form the upset head, and not primarily to swell the shank. Shank swelling is intended to be principally caused by force exerted on the core pin when the core pin is in contact with the base of the recess.

The term "overlapping portions" is sometimes used to describe the interlocking portions of the core pin and of the rivet. On the core pin, these may assume various forms such as the tapered surface 62 in FIG. 9, the chamfered ends in FIG. 1, the tapered surface 83 in FIG. 13, the groove 217 in FIG. 15, and grooves 256 at both ends of the core pin in FIG. 22. On the rivet itself, the overlapping portion is ordinarily a part of the inside wall bounding the internal recess in the initially tubular upsettable portion of the rivet. This portion has moved to extend radially inward toward the axis to form an overlapping portion, thereby to overlap a portion of the core pin. As a consequence, the cooperating overlapped, interlocked portions prevent axial separation of the core pin and the upset head from one another. The maximum diameter of the upset head is larger than the maximum diameter of the core pin in all embodiments. The maximum diameter of the core pin is preferably small enough that it can pass through the hole.

The upset head bears directly against a surface of an object comprising the workpiece.

The term "grip" or "grip length" is the combined thicknesses of the objects at the hole. It includes the depth of a countersink. When a countersink head is used, it bears against a surface of an object at the hole (the countersink). That surface is included in the grip of the hole. When a protruding head is used, it bears against a surface of an object at the hole (the region surrounding the hole).

The base (for example, base 54 or base 252) is sometimes called a "terminating surface" in this specification and in the claims. This surface is inside the recess and is bounded by the inside wall. The shank is in the hole in the workpiece, and is contiguous to and integral with the enlarged head. The shank is solid from the enlarged head substantially to the second end of the hole, but not beyond it. The only part of the upsettable end of the rivet which projects beyond the workpiece is the initially tubular upsettable portion. In some installations, the initially tubular upsettable portion will also enter into the workpiece.

The term "free end" is sometimes used to denote the end of the rivet opposite from the enlarged (manufactured) head, and the "free end" and "free end surface" of the core pin is that end of the core pin closest to the free end of the rivet.

It will be observed that in all embodiments that part of the core pin which lies inside the internal cylindrical wall of the tubular upsettable portion is incapable of transmitting upset forces to the tubular upsettable portion. This is to say that this part of the core pin is not an expander. It is an internal support. Only in the embodiments of FIGS. 14 and 20 does the core pin exert any upsetting force, and this is through a shoulder which is outside of the recess. The parts of the core pin inside the recess do not transmit upset forces to the tubular upsettable portion in these or in the other embodiments.

Furthermore, all abutting surfaces of the core pin and rivet in all of the embodiments are so disposed relative to the central axis of the rivet that any compressive force transmitted to the tubular upsettable portion of the rivet will be predominantly directed only other than radially outward. Thus, it is not intended that the core pin flare out the end of the tubular upsettable portion.

The result of the foregoing is a rivet assembly which can be made of high-strength material and set in relatively lower strength material without damaging the workpiece, either with or without an interference fit formed by expansion of the shank, and a joint with optimum properties as to shear and tension. This rivet is readily distinguished from conventional tubular rivets by virtue of the fact that the major proportion of the shank within the workpiece is of solid cross-section, and is not tubular, and the tubular section has sufficient volume of material to form an adequate head throughout an entire grip range, the head being formable at relatively low total forces. The shank swelling can be provided solely as a function of applied load, rather than of tool travel.

This invention is not to be limited by the embodiments shown in the drawings and described in the description, which are given by way of example and not of limitation, but only in accordance with the scope of the appended claims.

I claim:

1. A method of joining workpieces by setting a two-piece rivet assembly, which rivet assembly comprises a rivet with a head and a central axis, a solid shank of substantial length, and a tubular upsettable portion extending beyond said solid shank formed by a recess in the end of said rivet opposite from the head, there being an abutment surface at the intersection of the solid shank and the tubular upsettable portion and a core pin inside the recess adapted at least partially to abut said abutment surface, said method comprising: inserting said rivet through holes in said workpieces until the head abuts one workpiece and the core pin extends beyond another workpiece, holding said head against said one workpiece while applying an axial force on said upsettable portion to form a bulbular upset head, during at least the terminal portion of the formation of the bulbular upset head, simultaneously applying an axial end force to the core pin to press it axially against said abutment surface to cause the solid shank to expand principally as a consequence of columnar axial loading.

* * * * *